(12) United States Patent  
Hooshang

(10) Patent No.: US 11,366,480 B2
(45) Date of Patent: Jun. 21, 2022

(54) NAVIGATING A VEHICLE THROUGH A PREDEFINED PATH

(71) Applicant: Mazdak Hooshang, Karaj (IR)

(72) Inventor: Mazdak Hooshang, Karaj (IR)

(*) Notice: Subject to any disclaimer, the term of this patent is extended or adjusted under 35 U.S.C. 154(b) by 174 days.

(21) Appl. No.: 16/559,699

(22) Filed: Sep. 4, 2019

(65) Prior Publication Data

US 2019/0391593 A1   Dec. 26, 2019

Related U.S. Application Data

(60) Provisional application No. 62/726,514, filed on Sep. 4, 2018.

(51) Int. Cl.
*G05D 1/02* (2020.01)
*G05D 1/00* (2006.01)
*G01C 21/16* (2006.01)

(52) U.S. Cl.
CPC .......... *G05D 1/0272* (2013.01); *G01C 21/16* (2013.01); *G05D 1/0022* (2013.01); *G05D 1/027* (2013.01); *G05D 1/028* (2013.01); *G05D 2201/02* (2013.01)

(58) Field of Classification Search
CPC .... G05D 1/0272; G05D 1/0022; G05D 1/027; G05D 1/028; G05D 2201/02; G01C 21/16
See application file for complete search history.

(56) References Cited

U.S. PATENT DOCUMENTS 8,102,281 B2 * 1/2012 Ohki ................ G08G 1/096838
340/995.19
2007/0262882 A1 * 11/2007 Yamamoto ........... B60Q 1/1423
340/933

FOREIGN PATENT DOCUMENTS

CN        108387236 A   *  8/2018
WO   WO-2015143170 A1   *  9/2015   .......... H04W 52/383

OTHER PUBLICATIONS

English Translation of Foreign Document (CN-108387236-A).*

* cited by examiner

*Primary Examiner* — Rami Khatib
*Assistant Examiner* — Shahira Baajour
(74) *Attorney, Agent, or Firm* — Bajwa IP Law Firm; Haris Zaheer Bajwa

(57) ABSTRACT

A method for navigating a vehicle through a predefined path in an environment. The predefined path includes a plurality of predefined points. The method includes generating a distance database, enabling the predefined path by enabling each of the plurality of predefined points, navigating the vehicle to a first point, and navigating the vehicle from the first point to a second point. The distance database is associated with the predefined path. The first point and the second point are located on the predefined path. Navigating the vehicle from the first point to the second point includes repeating an iterative navigation process until a termination condition is satisfied. The termination condition includes a total traveled distance of the vehicle obtained from odometer data of the vehicle exceeding a termination threshold.

20 Claims, 12 Drawing Sheets

NAVIGATING A VEHICLE THROUGH A PREDEFINED PATH

CROSS-REFERENCE TO RELATED APPLICATION

This application claims the benefit of priority from U.S. Provisional Patent Application Ser. No. 62/726,514, filed on Sep. 4, 2018, and entitled "PREDEFINED PATHS FRAMEWORK FOR RADIO NAVIGATION OF AUTOMATED GUIDED VEHICLES," which is incorporated herein by reference in its entirety.

TECHNICAL FIELD

The present disclosure generally relates to radio navigation, and particularly, to vehicle navigation.

BACKGROUND

Navigation of a vehicle is a process of finding a value for steering wheel commands so that the vehicle follows a desired path to reach a target. A common navigation method for vehicle navigation is utilizing radio transceivers to estimate a position of moving vehicle. However, position estimation by radio transceivers may have a low precision for industrial applications which may require high-precision vehicle navigation in predefined paths due to a limited driving space. There is, therefore, a need for a method for vehicle navigation with a high precision that may be able to navigate a vehicle in a predefined path.

SUMMARY

This summary is intended to provide an overview of the subject matter of the present disclosure and is not intended to identify essential elements or key elements of the subject matter, nor is it intended to be used to determine the scope of the claimed implementations. The proper scope of the present disclosure may be ascertained from the claims set forth below in view of the detailed description below and the drawings.

In one general aspect, the present disclosure describes an exemplary method for navigating a vehicle through a predefined path in an environment. The predefined path may include a plurality of predefined points. An exemplary method may include generating a distance database, selecting the predefined path by selecting each of the plurality of predefined points, navigating the vehicle to a first point, obtaining an initial traveled distance and an initial steering of the vehicle, and navigating the vehicle from the first point to a second point. An exemplary distance database may be associated with the predefined path. In an exemplary embodiment, the first point and the second point may be located on the predefined path. In an exemplary embodiment, the initial traveled distance and the initial steering may be associated with the first point. In an exemplary embodiment, obtaining the initial traveled distance may include calculating a length of the curve from the start point to the first point. In an exemplary embodiment, navigating the vehicle from the first point to the second point may include repeating an iterative navigation process until a termination condition is satisfied. An exemplary termination condition may include a total traveled distance of the vehicle obtained from odometer data of the vehicle exceeds a termination threshold.

An exemplary iterative navigation process may include obtaining a first plurality of distances by measuring each of the first plurality of distances between a mobile transceiver and a fixed transceiver of a plurality of fixed transceivers, extracting a second plurality of distances from the distance database, calculating a minimized estimation error between the first plurality of distances and the second plurality of distances utilizing the initial traveled distance and the initial steering, generating a steering command, navigating the vehicle by sending the steering command to the vehicle for a predefined period of time until the vehicle reaches a third point, and replacing the first point with the third point. In an exemplary embodiment, the mobile transceiver may be placed on the vehicle and the fixed transceiver may be placed at a predefined location in the environment. In an exemplary embodiment, the second plurality of distances may be associated with the first point. An exemplary steering command may be associated with the minimized estimation error.

In an exemplary embodiment, generating the distance database may include constructing a curve that passes through the plurality of predefined points utilizing a curve fitting method, driving the vehicle on the curve from a start point of the plurality of predefined points to an end point of the plurality of predefined points, measuring a traveled distance of a plurality of traveled distances on the curve from the start point to a predefined point of the plurality of predefined points utilizing odometer data of the vehicle, measuring a transceiver distance of a plurality of transceiver distances between the mobile transceiver and each of the plurality of fixed transceivers by receiving a transceiver signal from each of the plurality of fixed transceivers, associating the traveled distance, the transceiver distance, and a power of the transceiver signal with the predefined point, saving the traveled distance, the transceiver distance, and the power of the transceiver signal in the distance database and sending the distance database to a server.

In an exemplary embodiment, navigating the vehicle to the first point may include estimating an initial location of the vehicle at an initial point utilizing the mobile transceiver and the plurality of fixed transceivers, locating the first point by finding a closest distance from the predefined path to the initial location, and navigating the vehicle from the initial location to the first point by repeating a recursive navigation process until a distance of an updated location of the vehicle from the first point becomes smaller than a given threshold. In an exemplary embodiment, the recursive navigation process may include updating a pose of the vehicle based on the initial location utilizing an extended Kalman filtering (EKF)-based sensor fusion method, moving the vehicle in a direction associated with the pose until the vehicle reaches an updated point by sending a moving command to the vehicle, estimating the updated location of the vehicle at the updated point utilizing the mobile transceiver and the plurality of fixed transceivers, and replacing the initial point with the updated point.

In an exemplary embodiment, measuring each of the first plurality of distances between the mobile transceiver placed on the vehicle and the fixed transceiver may include selecting the fixed transceiver from the plurality of fixed transceivers based on the predefined path, the initial point, and working conditions of the fixed transceiver. In an exemplary embodiment, calculating the minimized estimation error may include minimizing a sum of squared differences between each of the first plurality of distances and a respective distance of the second plurality of distances by estimating a corrected steering of the vehicle and a corrected travelled distance on the curve from the start point to the first point. In an exemplary embodiment, the corrected travelled distance and the corrected steering may be associated with the second plurality of distances.

In an exemplary embodiment, extracting the second plurality of distances may include receiving the distance database from the server, finding a respective predefined point of the plurality of predefined points from the distance database, and extracting a respective plurality of transceiver distances associated with the respective predefined point. In an exemplary embodiment, the respective predefined point may be associated with the initial traveled distance.

An exemplary method may further include extracting the power of the transceiver signal from the distance database, measuring a signal power received from a respective fixed transceiver of the plurality of fixed transceivers, and stopping the vehicle by sending a stop command to the vehicle responsive to a difference between the power of the transceiver signal and the signal power being higher than a maximum threshold.

In an exemplary embodiment, replacing the first point with the third point may include estimating an updated traveled distance on the curve from the start point to the third point, replacing the initial traveled distance with the updated traveled distance, obtaining an updated steering of the vehicle, and replacing the initial steering with the updated steering. In an exemplary embodiment, estimating the updated traveled distance may include measuring a length of a route traveled by the vehicle from the first point to the third point utilizing odometer data of the vehicle and calculating the updated traveled distance by adding a value of the route length to a value of the corrected traveled distance.

Other exemplary systems, methods, features and advantages of the implementations will be, or will become, apparent to one of ordinary skill in the art upon examination of the following figures and detailed description. It is intended that all such additional systems, methods, features and advantages be included within this description and this summary, be within the scope of the implementations, and be protected by the claims herein.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

The following detailed description is presented to enable a person skilled in the art to make and use the methods and devices disclosed in exemplary embodiments of the present disclosure. For purposes of explanation, specific nomenclature is set forth to provide a thorough understanding of the present disclosure. However, it will be apparent to one skilled in the art that these specific details are not required to practice the disclosed exemplary embodiments. Descriptions of specific exemplary embodiments are provided only as representative examples. Various modifications to the exemplary implementations will be readily apparent to one skilled in the art, and the general principles defined herein may be applied to other implementations and applications without departing from the scope of the present disclosure. The present disclosure is not intended to be limited to the implementations shown but is to be accorded the widest possible scope consistent with the principles and features disclosed herein.

Herein is disclosed an exemplary method and system for navigating a vehicle through a predefined path. An exemplary method may include navigating a vehicle from an arbitrary location to the predefined path by iteratively estimating vehicle locations utilizing radio transceivers until the vehicle gets close enough to the predefined path with an acceptable uncertainty. The vehicle may then be navigated through the predefined path by iteratively measuring distances between the vehicle and a set of transceivers that are placed at fixed positions. These distances may be compared with predefined distances that are stored in a database and the vehicle may be steered in a direction that minimizes a difference between the two sets of distances. The navigation process may be iterated until the vehicle reaches a destination.

Figure 1A:
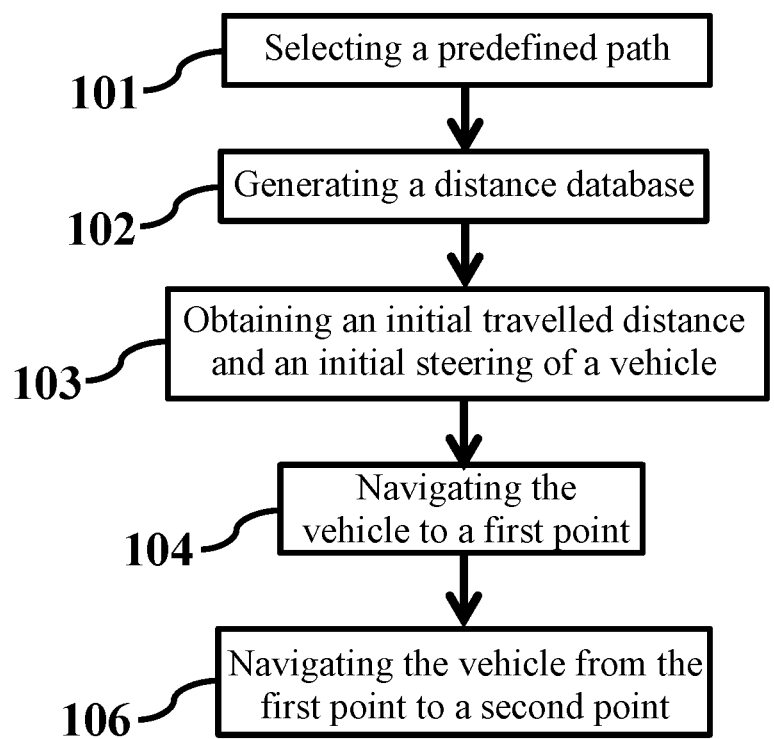
FIG. 1A shows a flowchart of a method for navigating a vehicle through a predefined path in an environment, consistent with one or more exemplary embodiments of the present disclosure.

FIG. 1A shows a flowchart of a method for navigating a vehicle through a predefined path in an environment, consistent with one or more exemplary embodiments of the present disclosure. An exemplary predefined path may include a plurality of predefined points. An exemplary method 100 may include selecting the predefined path by selecting each of the plurality of predefined points (step 101), generating a distance database (step 102), obtaining an initial traveled distance and an initial steering of the vehicle (step 103), navigating the vehicle to a first point (step 104), and navigating the vehicle from the first point to a second point (step 106). An exemplary distance database may be associated with the predefined path. In an exemplary embodiment, the first point and the second point may be located on the predefined path. In an exemplary embodiment, additional points may be reached similarly. In an exemplary embodiment, the initial traveled distance and the initial steering may be associated with the first point.

Figure 2:
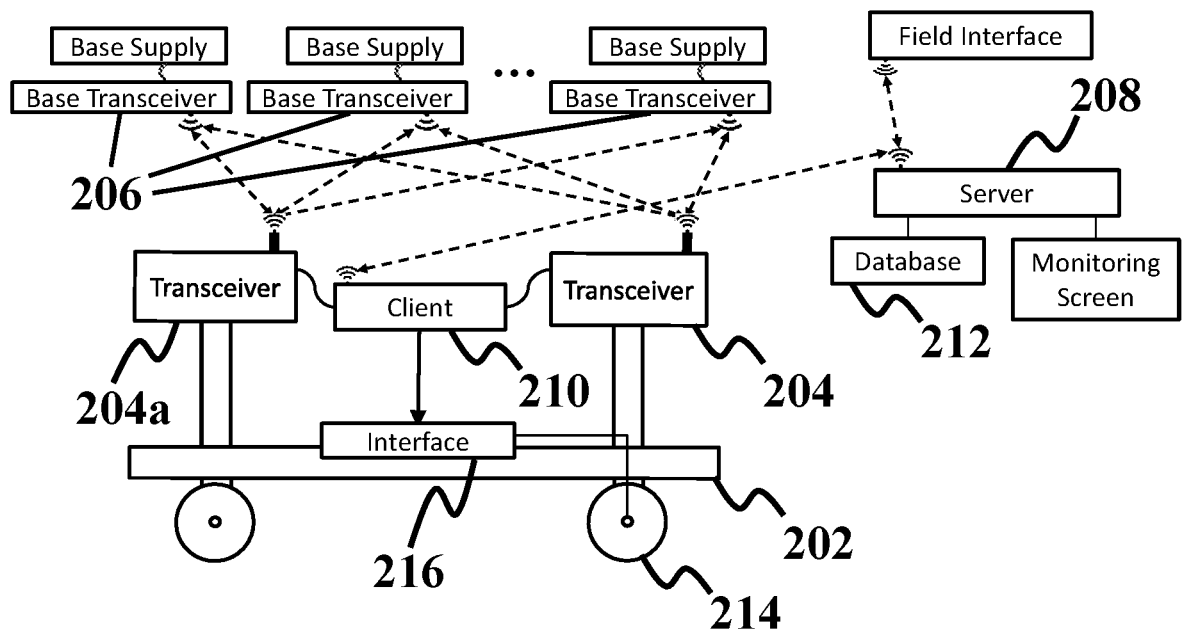
FIG. 2 shows a schematic of a system for navigating a vehicle through a predefined path in an environment, consistent with one or more exemplary embodiments of the present disclosure.

FIG. 2 shows a schematic of a system 200 for navigating a vehicle 202 through a predefined path in an environment, consistent with one or more exemplary embodiments of the present disclosure. In an exemplary embodiment, different steps of vehicle 202 may be implemented on system 200. In an exemplary embodiment, system 200 may include a mobile transceiver 204 (may also be referred to as a vehicle transceiver), a plurality of fixed transceivers 206 (may also be referred to as base transceivers), a server 208, and a client computer 210. In an exemplary embodiment, mobile transceiver 204 transceiver may be placed on vehicle 202 and each of plurality of fixed transceivers 206 may be placed at a predefined location in an exemplary environment.

Figure 3A:
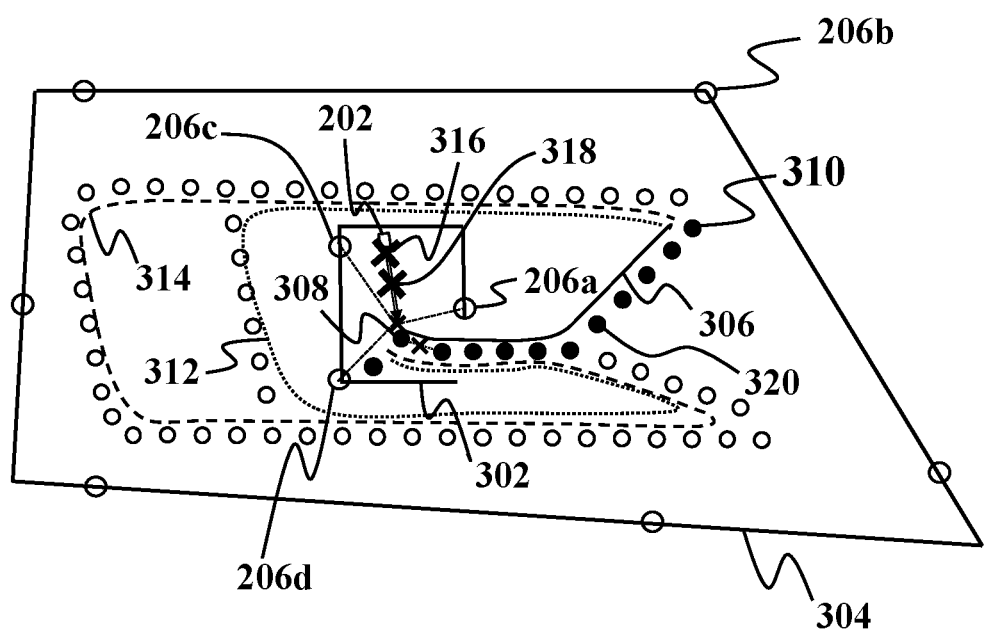
FIG. 3A shows a schematic of an environment in which a vehicle is navigated through a predefined path, consistent with one or more exemplary embodiments of the present disclosure.

For further detail with respect to system 200, FIG. 3A shows a schematic of an exemplary environment in which an vehicle is navigated through a predefined path, consistent with one or more exemplary embodiments of the present disclosure. An exemplary environment 300 may include several obstacles which may limit movement of vehicle 202 in environment 300. For example, environment 300 may include an inner wall 302 and an outer wall 304. In an exemplary embodiment, each of the plurality of fixed transceivers may be mounted on inner wall 302 or outer wall 304. In an exemplary embodiment, exemplary fixed transceivers similar to a fixed transceiver 206a may be mounted on inner wall 302 and exemplary fixed transceivers similar to a fixed transceiver 206b may be mounted on outer wall 304.

Referring to FIGS. 1A, 2, and 3A, in an exemplary embodiment, step 101 may include enabling a predefined path 306 from a first point 308 to an end point 310. In an exemplary embodiment, server 208 may be configured to receive information from each of the plurality of predefined points (represented by black circles in FIG. 3A). In an exemplary embodiment, based on the received information, server 208 may determine whether there is an available route from first point 308 to each of the plurality of predefined points in predefined path 306. Accordingly, server 208 may select each of the plurality of predefined points. In an exemplary embodiment, server 208 may be configured to select each of the plurality of predefined points by assigning a respective tag to each of enabled points. In an exemplary embodiment, if all of the plurality of predefined points are selected, predefined path 306 may be selected. Otherwise, in an exemplary embodiment, other potential paths from first point 308 to end point 310 may be investigated by server 208. For example, potential paths 312 and 314 may also be utilized to navigate vehicle 202 from first point 308 to end point 310 if predefined path 306 is not selected. In an exemplary embodiment, each of potential paths 312 and 314 may include a plurality of potential points (represented by hollow circles along each of potential paths 312 and 314 in FIG. 3A) which may be selected to select a respective potential path. In an exemplary embodiment, locations of the plurality of predefined points and the plurality of potential points in environment 300 may be determined prior to starting method 100.

Figure 1B:
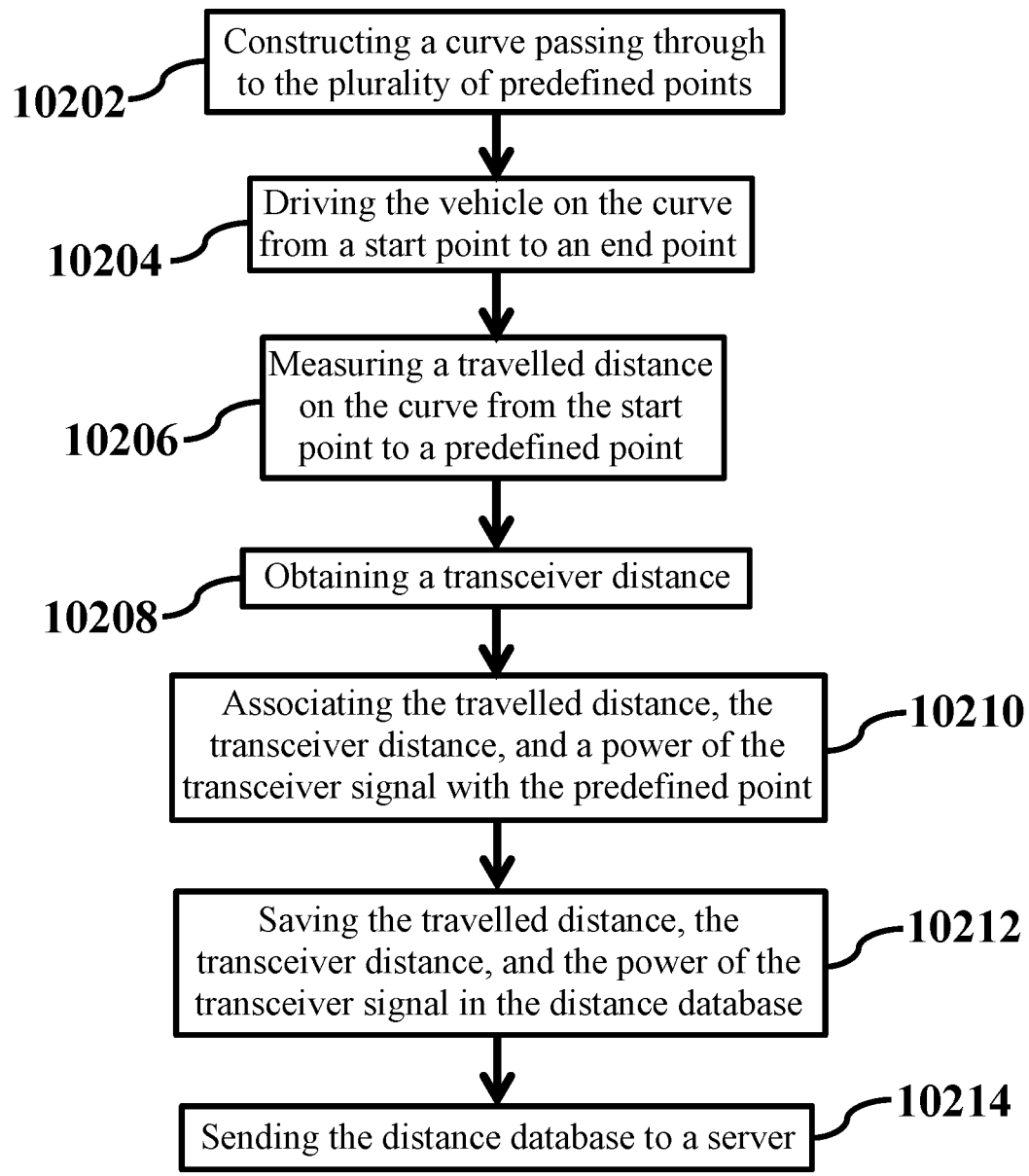
FIG. 1B shows a flowchart for generating a distance database, consistent with one or more exemplary embodiments of the present disclosure.

For further detail with respect to step 102, FIG. 1B shows a flowchart for generating a distance database, consistent with one or more exemplary embodiments of the present disclosure. Referring to FIGS. 1B and 2, in an exemplary embodiment, generating a distance database 212 may include constructing a curve that may pass through the plurality of predefined points (step 10202), driving the vehicle on the curve from a start point of the plurality of predefined points to an end point of the plurality of predefined points (step 10204), measuring a traveled distance of a plurality of traveled distances on the curve from the start point to a predefined point of the plurality of predefined points utilizing odometer data of the vehicle (step 10206), obtaining a transceiver distance of a plurality of transceiver distances (step 10208), associating the traveled distance, the transceiver distance, and a power of the transceiver signal with the predefined point (step 10210), saving the traveled distance, the transceiver distance, and the power of the transceiver signal in the distance database (step 10212), and sending the distance database to the server (step 10214).

Figure 4:
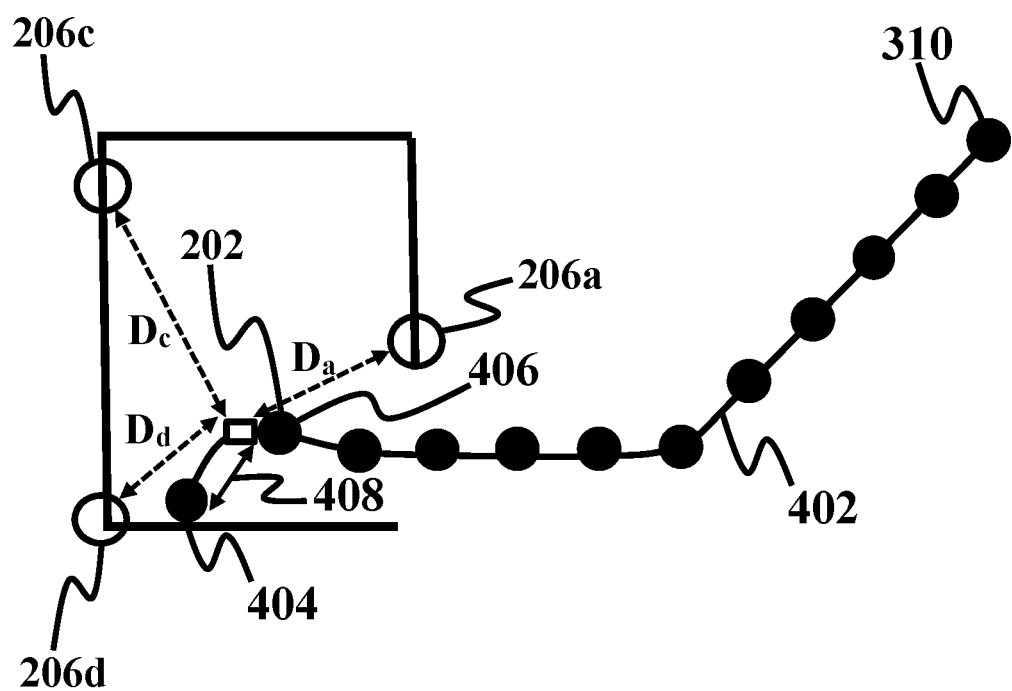
FIG. 4 shows a curve fitted to a plurality of predefined points, consistent with one or more exemplary embodiments of the present disclosure.

In further detail with regards to steps 10202-10214, FIG. 4 shows a curve fitted to a plurality of predefined points, consistent with one or more exemplary embodiments of the present disclosure. In an exemplary embodiment, a curve 402 may be fitted to a plurality of predefined points (represented by black circles in FIG. 4). In an exemplary embodiment, different conventional curve fitting methods may be utilized to construct curve 402. Referring again to FIG. 2, in an exemplary embodiment, either of client computer 210 or server 208 may be configured to construct curve 402 by implementing a curve fitting method.

In an exemplary embodiment, vehicle 202 may be manually driven by an operator on curve 402 from a start point 404 to end point 310. In an exemplary embodiment, a distance traveled by vehicle 202 from start point 404 to each of the plurality of predefined points may be measured upon reaching each respective point. For example, at a predefined point 406, a traveled distance 408 from start point 404 to predefined point 406 may be measured upon reaching predefined point 406 utilizing odometer data of vehicle 202. In an exemplary embodiment, the odometer data may be captured from a wheel encoder placed on a wheel 214 of vehicle 202 by a vehicle interface 216. In an exemplary embodiment, the captured data may be sent to client computer 210 to calculate traveled distance 408.

In further details regarding step 10208, obtaining a transceiver distance may include receiving a transceiver signal from each of plurality of fixed transceivers 206 and measuring a distance between mobile transceiver 204 and a respective fixed transceiver of plurality of fixed transceivers 206. In an exemplary embodiment, a plurality of transceiver distances may be measured between mobile transceiver 204 (placed on vehicle 202) and each of plurality of plurality of fixed transceivers 206 when vehicle 202 arrives at each of the plurality of predefined points. In an exemplary embodiment, exemplary transceiver distances similar to transceiver distances $D_a$, $D_c$, and $D_d$ may be measured between mobile transceiver 204 and fixed transceivers 206a, 206c, and 206d, respectively. In an exemplary embodiment, vehicle 202 may be equipped with an additional mobile transceiver 204a. In this case, an additional distance may be obtained between additional mobile transceiver 204a and each of plurality of fixed transceivers 206 which may be used for enhancing measurement precision. In an exemplary embodiment, to measure each of the plurality of transceiver distances, a respective signal may be received by mobile transceiver 204 from a fixed transceiver. In an exemplary embodiment, the received signal may be sent to client computer 210 to calculate a respective transceiver distance. In an exemplary embodiment, the power of the received signal may also be sent to client computer 210.

In an exemplary embodiment, after obtaining the traveled distance, the transceiver distance, and the power of the transceiver signal at a respective predefined point, the obtained values may be associated with the respective predefined point and may be saved in distance database 212. In an exemplary embodiment, exemplary traveled distances similar to traveled distance 408, exemplary transceiver distances similar to transceiver distances $D_a$, $D_c$, and $D_d$, and powers of received signals from exemplary fixed transceivers similar to fixed transceivers 206a, 206c, and 206d may be associated with predefined point 406. As a result, in an exemplary embodiment, a separate dataset may be generated for each of the plurality of predefined points. In an exemplary embodiment, distance database 212 may be formed by integrating different generated datasets. In an exemplary embodiment, distance database 212 may be sent to server 208 after a respective dataset is obtained from end point 310.

Referring again to FIG. 1A, in an exemplary embodiment, obtaining the initial traveled distance in step 103 may include calculating a length of curve 402 from start point 404 to first point 308. In an exemplary embodiment, an approximate location of vehicle 202 after being navigated from initial point 316 to first point 308 (step 104) may be utilized by client computer 210 to calculate the initial traveled distance. In an exemplary embodiment, obtaining the initial steering of vehicle 202 in step 103 may include acquiring a moving direction of vehicle 202 from wheel 214 by vehicle interface 216 and sending data associated with the moving direction of vehicle 202 to client computer 210.

Figure 1C:
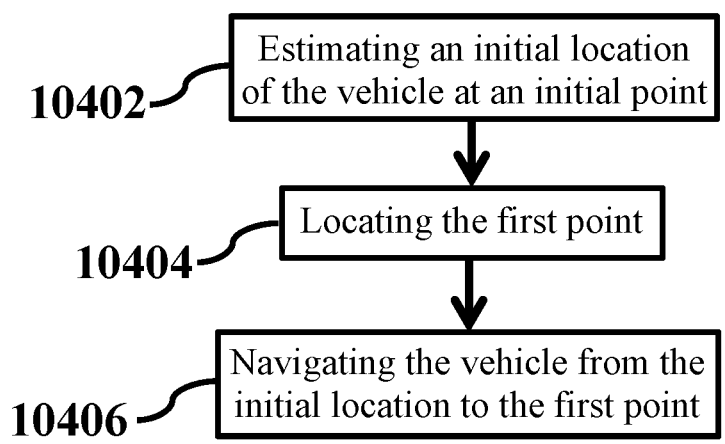
FIG. 1C shows a flowchart for navigating an automatically guide vehicle (vehicle) to a first point, consistent with one or more exemplary embodiments of the present disclosure.

For further detail with respect to step 104, FIG. 1C shows a flowchart for navigating a vehicle to a first point, consistent with one or more exemplary embodiments of the present disclosure. Referring also to FIG. 3A, in an exemplary embodiment, navigating vehicle 202 to first point 308 may include estimating an initial location of vehicle 202 at an initial point 316 (step 10402), locating the first point (step 10404), and navigating the vehicle from the initial location to the first point (step 10406).

In further detail with regards to step 10402, in an exemplary embodiment, initial point 316 may refer to an arbitrary location at which vehicle 202 may be present prior to starting the navigation process. Therefore, in an exemplary embodiment, the initial location of vehicle 202 may be required to navigate vehicle 202 to an appropriate point in predefined path 306. In an exemplary embodiment, the initial location may be estimated utilizing mobile transceiver 204 and plurality of fixed transceivers 206. In an exemplary embodiment, an appropriate set of fixed transceivers may be selected from plurality of fixed transceivers 206 based on a quality of a signal from each fixed transceiver that may be received by vehicle 202. For example, in FIG. 3A, since vehicle 202 is surrounded by inner wall 302, a set of fixed transceivers 206a, 206c, and 206d may be appropriate for estimating the initial location of vehicle 202 since the quality of received signals from this set of fixed transceivers may be higher than that of other fixed transceivers which are mounted on outer wall 304. In an exemplary embodiment, inner wall 302 may deteriorate the quality of signals emitted from fixed transceivers mounted on outer wall 304 before reaching vehicle 202. In an exemplary embodiment, at least three fixed transceivers may be required for estimating a unique location for vehicle 202. In an exemplary embodiment, a distance between mobile transceiver 204 and each fixed transceiver in the set of fixed transceivers may be calculated by client computer 210. In an exemplary embodiment, conventional location estimation methods may be employed after obtaining distance data for estimating the initial location of vehicle 202.

In further detail with respect to step 10404, in an exemplary embodiment, first point 308 may be located by finding a smallest distance between curve 402 and the initial location. In an exemplary embodiment, the location of first point 308 may be estimated by interpolation based a location of a predefined point on predefined path 306 which may be closer to first point 308 than other predefined points. In an exemplary embodiment, vehicle 202 may then be navigated from initial point 316 to first point 308.

For further detail with respect to step 10406, vehicle 202 may be navigated from initial point 316 to first point 308 by repeating a recursive navigation process until a distance of an updated location of vehicle 202 from first point 308 becomes smaller than a given threshold. In an exemplary embodiment, the given threshold may be determined based on an expected precision of distance measurements which may be based on data acquired from mobile transceiver 204 and plurality of fixed transceivers 206.

Figure 1D:
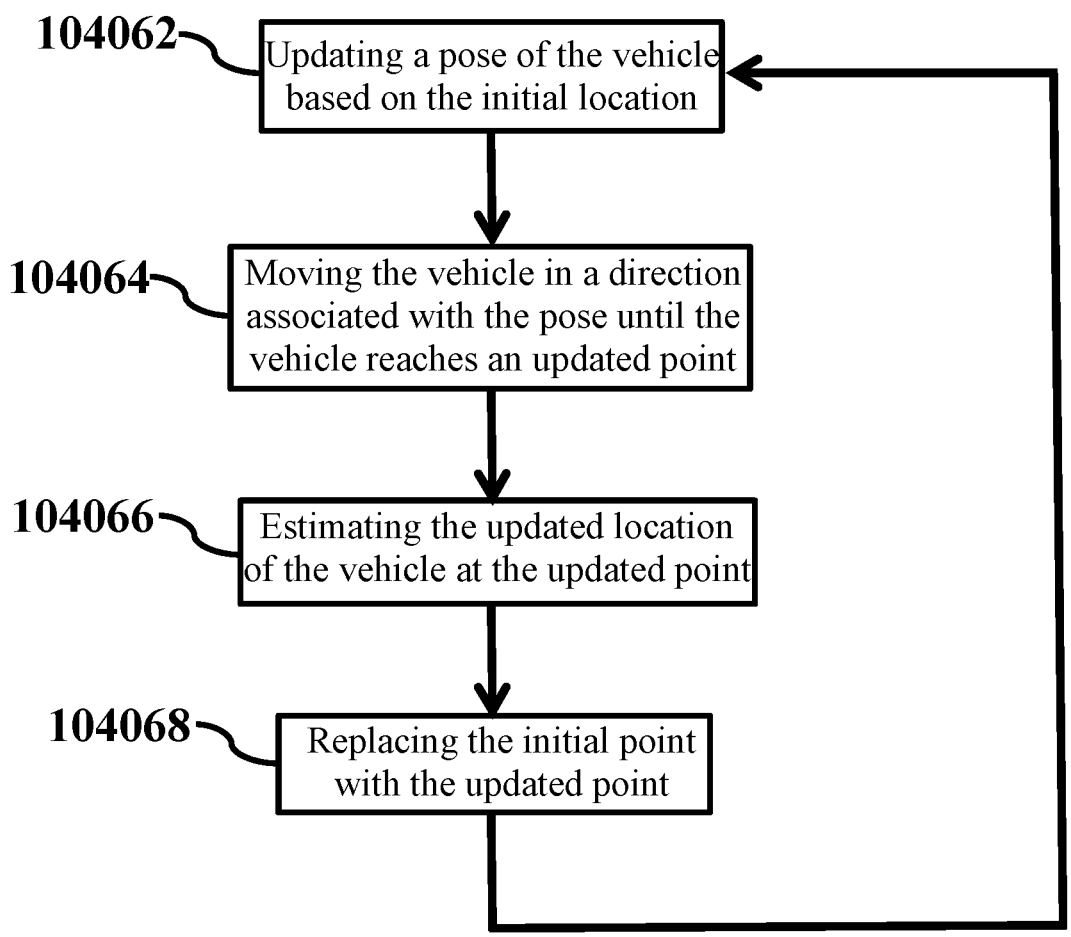
FIG. 1D shows a flowchart for a recursive navigation process, consistent with one or more exemplary embodiments of the present disclosure.

FIG. 1D shows a flowchart for a recursive navigation process, consistent with one or more exemplary embodiments of the present disclosure. An exemplary recursive navigation process 104060 may include updating a pose of the vehicle based on the initial location (step 104062), moving the vehicle in a direction associated with the pose until the vehicle reaches an updated point (step 104064) by sending a moving command to the vehicle, estimating the updated location of the vehicle at the updated point (step 104066), and replacing the initial point with the updated point (step 104068). In an exemplary embodiment, recursive navigation process 104060 may restart at the updated point until vehicle 202 reaches a point that is close enough to first point 308, i.e., the distance between the updated location and first point 308 becomes smaller than the given threshold.

For further detail with regards to steps 104062-104068, in an exemplary embodiment, the pose of vehicle 202 may be estimated utilizing a conventional sensor fusion method, such as an extended Kalman filtering (EKF)-based sensor fusion method. In an exemplary embodiment, the initial location and odometer data of vehicle 202 may be used as input data by the EKF-based sensor fusion method to update the pose of vehicle 202. In an exemplary embodiment, the EKF-based sensor fusion method may be implemented in client computer 210. A new moving direction of vehicle 202 may be obtained by client computer 210 based on the updated pose. In an exemplary embodiment, client computer 210 may then send the moving command to vehicle 202 to update its moving direction. Referring again to FIG. 3A, in an exemplary embodiment, vehicle 202 may keep moving in the new direction until it reaches an updated point 318. In an exemplary embodiment, a location of updated point 318 may then be estimated utilizing mobile transceiver 204 and plurality of fixed transceivers 206 similar to estimating the location of initial point 316. In an exemplary embodiment, updated point 318 may then replace initial point 316 and recursive navigation process 104060 may restart at updated point 318.

Referring again to FIG. 1A and FIG. 3A, in an exemplary embodiment, navigating vehicle 202 from first point 308 to a second point 320 (step 106) may include repeating an iterative navigation process until a termination condition is satisfied. An exemplary termination condition may include a total traveled distance of vehicle 202 exceeds a termination threshold. In an exemplary embodiment, the total traveled distance may be obtained from odometer data utilizing the wheel encoder of vehicle 202. An exemplary termination threshold may be determined based on an expected distance that vehicle 202 may travel until it reaches an expected destination.

Figure 1E:
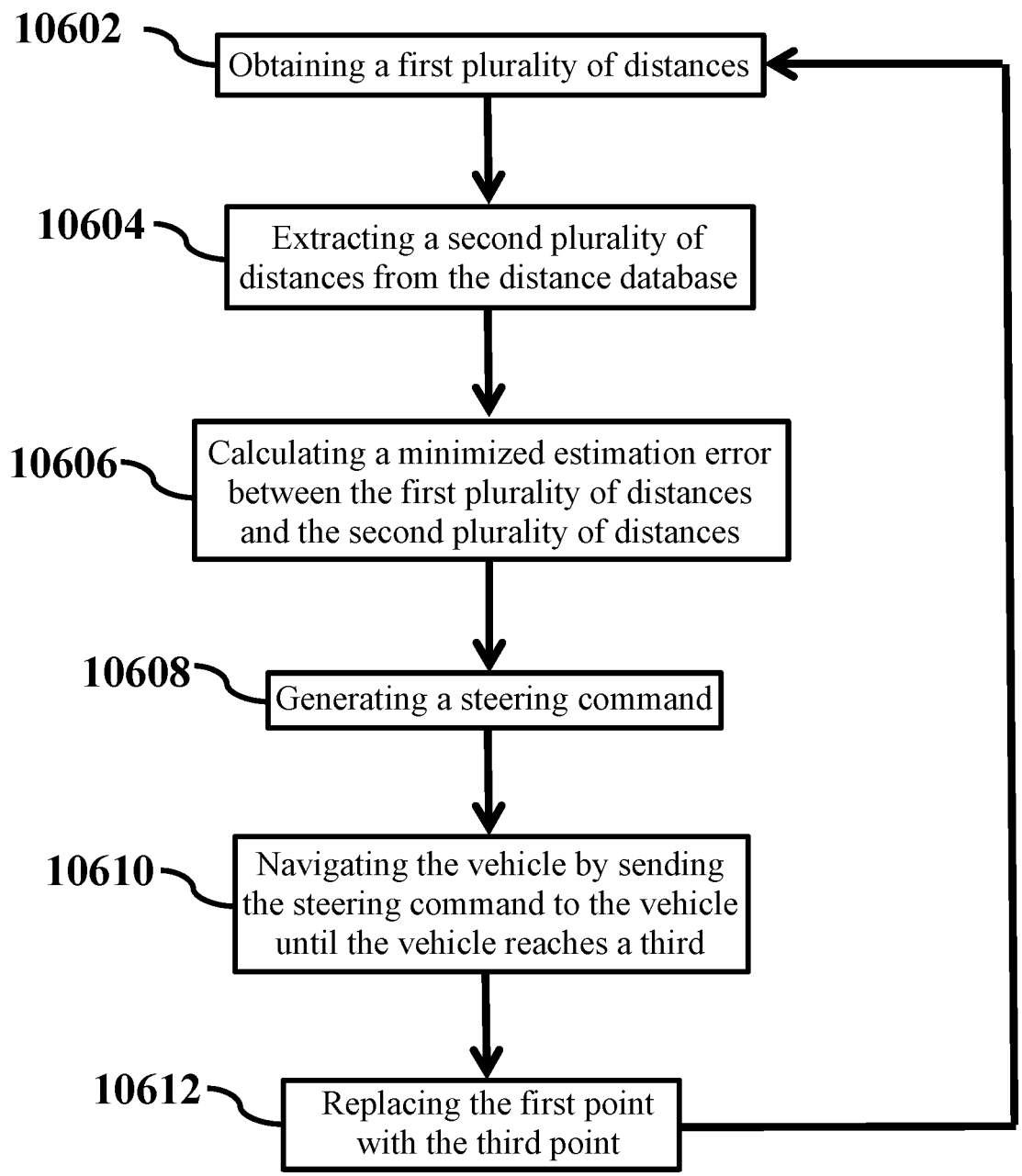
FIG. 1E shows a flowchart for an iterative navigation process, consistent with one or more exemplary embodiments of the present disclosure.

FIG. 1E shows a flowchart for an iterative navigation process, consistent with one or more exemplary embodiments of the present disclosure. An exemplary iterative navigation process 10600 may include obtaining a first plurality of distances (step 10602), extracting a second plurality of distances from the distance database (step 10604), calculating a minimized estimation error between the first plurality of distances and the second plurality of distances (step 10606), generating a steering command (step 10608), navigating the vehicle by sending the steering command to the vehicle for a predefined period of time until the vehicle reaches a third point (step 10610), and replacing the first point with the third point (step 10612). In an exemplary embodiment, the second plurality of distances may be associated with the first point.

Figure 3B:
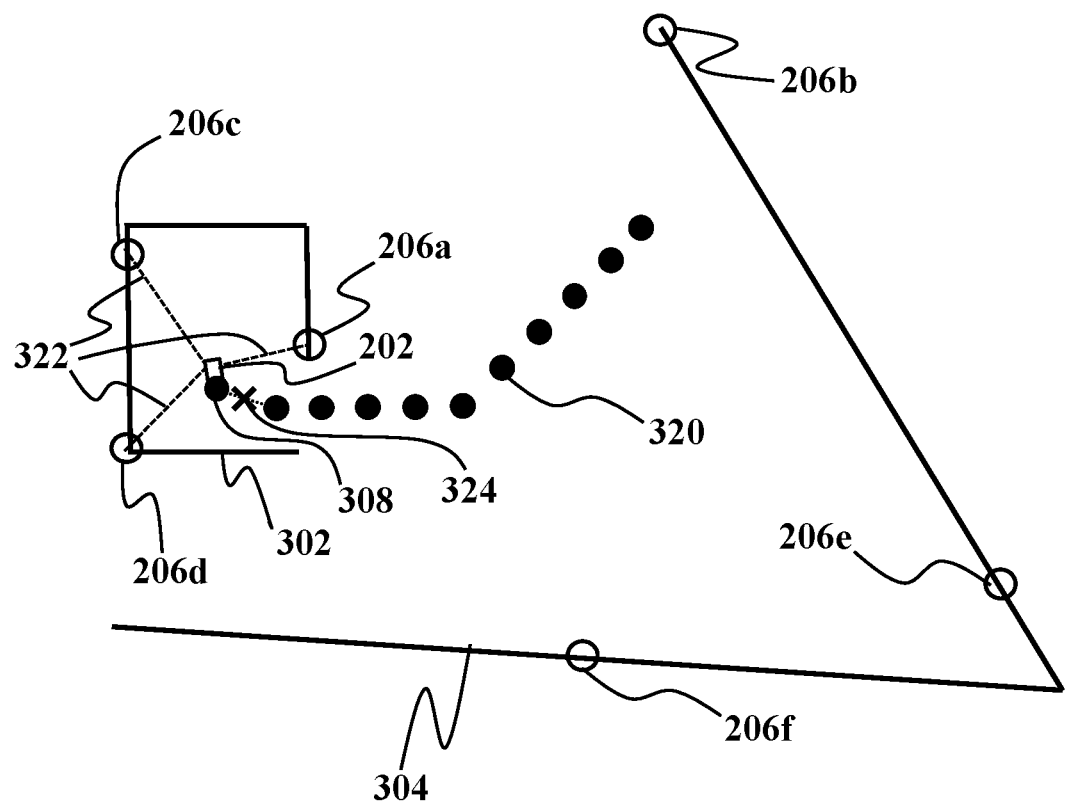
FIG. 3B shows a schematic of a predefined path through which a vehicle is navigated, consistent with one or more exemplary embodiments of the present disclosure.

In further detail with respect to steps 10602-10612, FIG. 3B shows a schematic of a predefined path through which a vehicle is navigated, consistent with one or more exemplary embodiments of the present disclosure. In an exemplary embodiment, a first plurality of distances 322 may be obtained by measuring each of first plurality of distances 322 between mobile transceiver 204 (place on vehicle 202) and each fixed transceiver in the set of fixed transceivers 206a, 206c, and 206d. Referring again to FIG. 3A, in an exemplary embodiment, each fixed transceiver may in the set of fixed transceivers may be selected from plurality of fixed transceivers 206 based on predefined path 306, initial point 316, and working conditions of the fixed transceiver. In an exemplary embodiment, a quality of a signal that is received from a fixed transceiver by vehicle 202 may be used as a criterion to check suitability of the fixed transceiver.

Figure 1F:
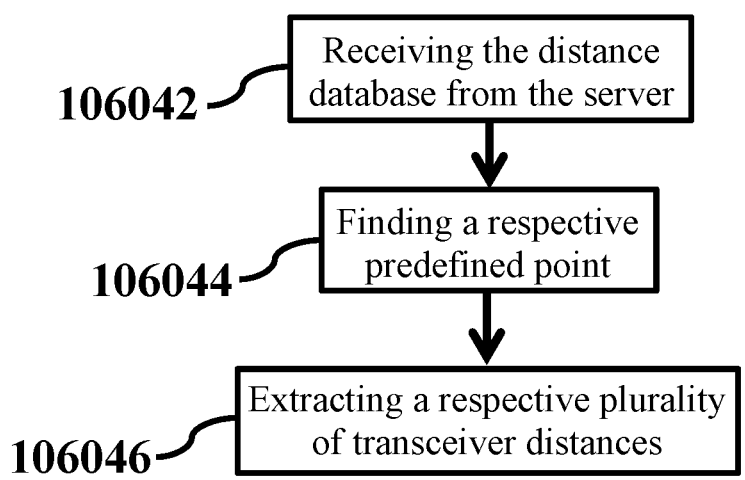
FIG. 1F shows a flowchart for extracting a second plurality of distances, consistent with one or more exemplary embodiments of the present disclosure.

For further detail with respect to step 10604, FIG. 1F shows a flowchart for extracting a second plurality of distances, consistent with one or more exemplary embodiments of the present disclosure. In an exemplary embodiment, extracting the second plurality of distances may include receiving the distance database from the server (step 106042), finding a respective predefined point of the plurality of predefined points from the distance database (step 106044), and extracting a respective plurality of transceiver distances associated with the respective predefined point (step 106046). In an exemplary embodiment, the respective predefined point may be associated with the initial traveled distance.

In further detail with regards to steps 106042-106046, in an exemplary embodiment, client computer 210 may receive distance database 212 from server 208 prior to extracting the second plurality of distances. Referring again to FIGS. 1A, 2, and 4, in an exemplary embodiment, client computer 210 may locate the respective predefined point in distance database 212 using the initial traveled distance on curve 402 from start point 404 to a current approximate position of vehicle 202 (for example, first point 308. In an exemplary embodiment, a set of transceiver distances associated with the respective predefined point may be then extracted from distance database 212. In an exemplary embodiment, each of the extracted transceiver distances may correspond to a respective distance of first plurality of distances 322. In other words, each of the extracted transceiver distances may be obtained utilizing a same fixed transceiver as that of the corresponding distance of first plurality of distances 322. In an exemplary embodiment, the second plurality of distances may be obtained by an interpolation of the extracted transceiver distances based on a difference between a location of first point 308 and the respective predefined point. In an exemplary embodiment, method 100 may further include extracting a power of each transceiver signal associated with the second plurality of distances from distance database 212 and measuring a signal power received from a respective fixed transceiver associated with first plurality of distances 322. In an exemplary embodiment, if a difference between two respective power values (i.e., power values associated with a same fixed transceiver) is higher than a maximum threshold, client computer 210 may stop vehicle 202 from moving further due to safety considerations. In an exemplary embodiment, an unknown abnormality (such as an unexpected obstacle) may cause such a situation and therefore, navigating vehicle 202 further may result in an unexpected damage to vehicle 202. In an exemplary embodiment, the maximum threshold may be determined based on environmental conditions and/or working conditions of plurality of fixed transceivers 206.

Referring again to FIG. 1E, in an exemplary embodiment, calculating the minimized estimation error (step 10606) may include minimizing a sum of squared differences between each of first plurality of distances 322 and a respective distance of the second plurality of distances. In an exemplary embodiment, the sum of squared differences may be minimized by estimating a corrected steering of vehicle 202 and a corrected travelled distance on curve 402 from start point 404 to first point 308. In an exemplary embodiment, the corrected travelled distance and the corrected steering may be associated with the second plurality of distances. In an exemplary embodiment, conventional minimization methods, such as a least-square method, may be utilized for estimating the corrected travelled distance and the corrected steering that may minimize the estimation error. Accordingly, in an exemplary embodiment, client computer 210 may generate a steering command based on the corrected steering that may modify a moving direction of vehicle 202 so that vehicle 202 may be navigated more accurately through predefined path 306. Next, in an exemplary embodiment, client computer 210 may send the steering command to vehicle 202 to update a moving direction of vehicle 202. In an exemplary embodiment, vehicle 202 may keep moving in the new direction until it reaches a third point 324. In an exemplary embodiment, first point 308 may then be replaced with third point 324 (step 10612) and iterative navigation process 10600 may be restarted at third point 324.

Figure 1G:
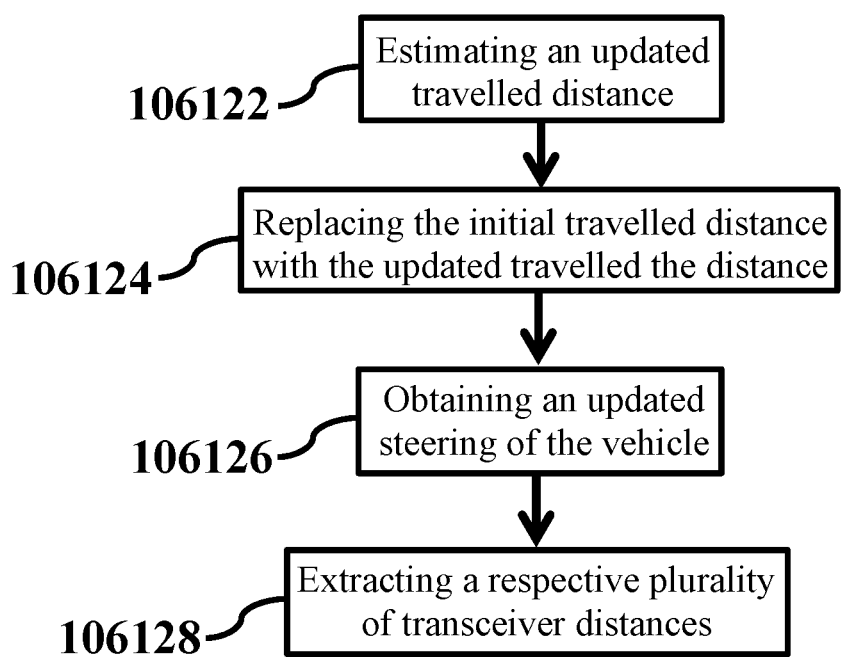
FIG. 1G shows a flowchart for replacing a first point with a third point, consistent with one or more exemplary embodiments of the present disclosure.

For further detail with respect to step 10612, FIG. 1G shows a flowchart for replacing a first point with a third point, consistent with one or more exemplary embodiments of the present disclosure. In an exemplary embodiment, replacing first point 308 with third point 324 (step 10612) may include estimating an updated traveled distance on curve 402 from start point 404 to third point 324 (step 106122), replacing the initial traveled distance with the updated traveled distance (step 1061224), obtaining an updated steering of vehicle 202 (step 1061226), and replacing the initial steering with the updated steering (step 1061228).

For further detail with regards to step 106122, in an exemplary embodiment, estimating the updated traveled distance may include measuring a length of a route traveled by vehicle 202 from the first point 308 to third point 324 utilizing odometer data of vehicle 202 and calculating the updated traveled distance by adding a value of the route length to a value of the corrected traveled distance. As a result, in an exemplary embodiment, the corrected traveled distance may be utilized to correct inaccuracies of odometer data of vehicle 202 at each point on predefined path 306 where iterative navigation process 10600 is repeated. In an exemplary embodiment, accumulation of inaccuracies of odometer data may be prevented by repeatedly correcting a traveled distance of vehicle 202 through predefined path 306.

In further detail with regards to step 106126, in an exemplary embodiment, obtaining the updated steering of vehicle 202 may include acquiring a moving direction of vehicle 202 from wheel 214 by vehicle interface 216 and sending data associated with the moving direction of vehicle 202 to client computer 210.

In an exemplary embodiment, at any point in predefined path 306, for example second point 320, the current set of fixed transceivers may be replaced by a new set of fixed transceivers if quality of transceiver signals becomes unacceptable. In an exemplary embodiment, an unacceptable quality may refer to a quality that may be lower than a level that may be required for navigating vehicle 202 by processing received transceiver signals. Referring again to FIG. 3B, in an exemplary embodiment, an exemplary set of fixed transceivers similar to set 206*a*, 206*c*, and 206*d* may be replaced with a new exemplary set of fixed transceivers similar to 206*b*, 206*e*, and 206*f* mounted on outer wall 304 since inner wall 302 may prevent high-quality signals from reaching second point 320 from fixed transceivers 206*c* and 206*d*. In an exemplary embodiment, for navigating vehicle 202 further on predefined path 306, second point 320 may replace first point 308 and iterative navigation process 10600 may continue with a new exemplary set of fixed transceivers similar to set 206*b*, 206*e*, and 206*f*.

Figure 5:
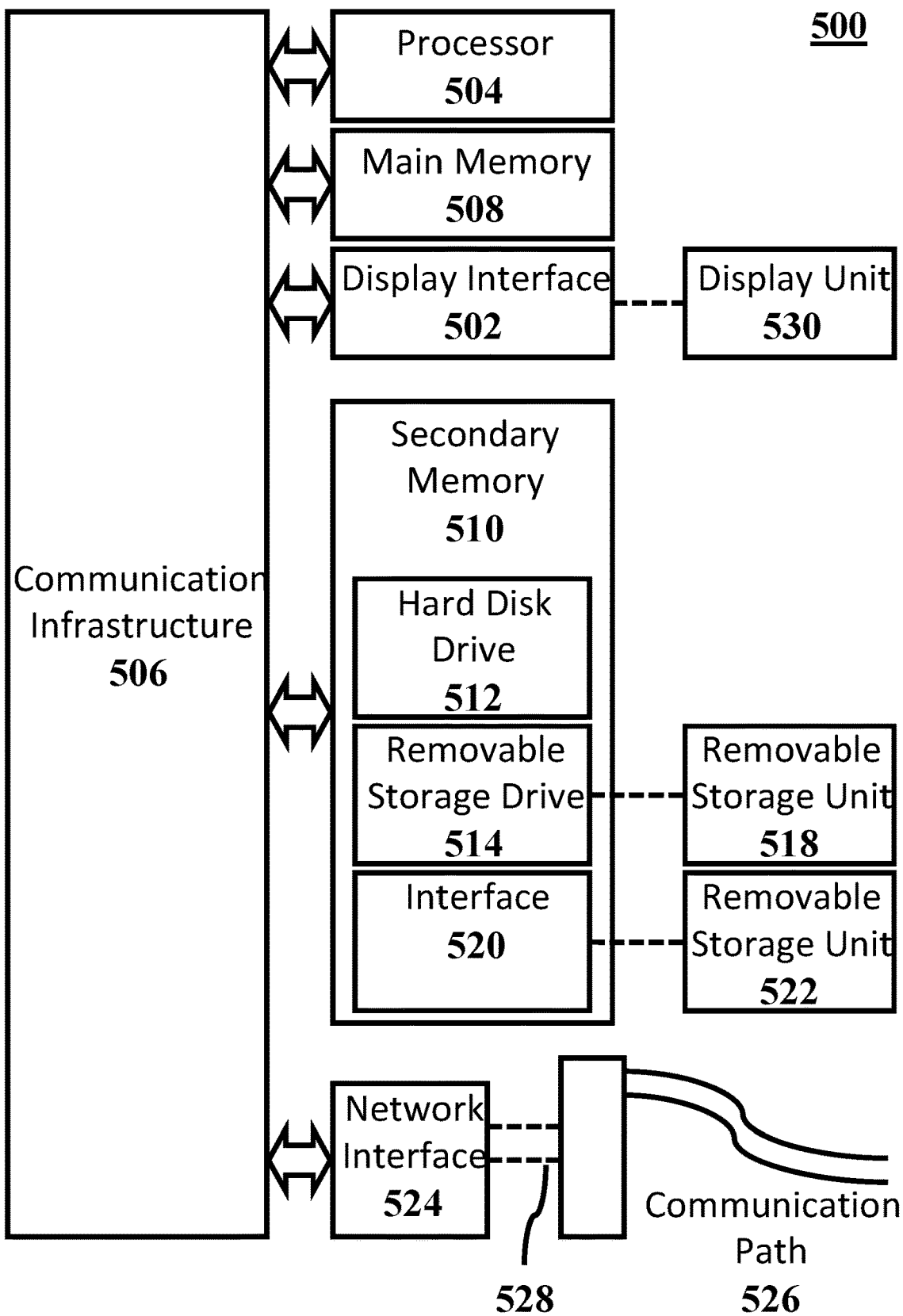
FIG. 5 shows a high-level functional block diagram of a computer system, consistent with one or more exemplary embodiments of the present disclosure.

FIG. 5 shows an example computer system 500 in which an embodiment of the present invention, or portions thereof, may be implemented as computer-readable code, consistent with exemplary embodiments of the present disclosure. For example, client computer 210 or server 208 may be implemented in computer system 500 using hardware, software, firmware, tangible computer readable media having instructions stored thereon, or a combination thereof and may be implemented in one or more computer systems or other processing systems. Hardware, software, or any combination of such may embody any of the modules and components in FIGS. 1A-4.

If programmable logic is used, such logic may execute on a commercially available processing platform or a special purpose device. One ordinary skill in the art may appreciate that an embodiment of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, a computing device having at least one processor device and a memory may be used to implement the above-described embodiments. A processor device may be a single processor, a plurality of processors, or combinations thereof. Processor devices may have one or more processor "cores."

An embodiment of the invention is described in terms of this example computer system 500. After reading this description, it will become apparent to a person skilled in the relevant art how to implement the invention using other computer systems and/or computer architectures. Although operations may be described as a sequential process, some of the operations may in fact be performed in parallel, concurrently, and/or in a distributed environment, and with program code stored locally or remotely for access by single or multiprocessor machines. In addition, in some embodiments the order of operations may be rearranged without departing from the spirit of the disclosed subject matter.

Processor device 504 may be a special purpose or a general-purpose processor device. As will be appreciated by persons skilled in the relevant art, processor device 504 may also be a single processor in a multi-core/multiprocessor system, such system operating alone, or in a cluster of computing devices operating in a cluster or server farm. Processor device 504 may be connected to a communication infrastructure 506, for example, a bus, message queue, network, or multi-core message-passing scheme.

In an exemplary embodiment, computer system 500 may include a display interface 502, for example a video connector, to transfer data to a display unit 530, for example, a monitor. Computer system 500 may also include a main memory 508, for example, random access memory (RAM), and may also include a secondary memory 510. Secondary memory 510 may include, for example, a hard disk drive 512, and a removable storage drive 514. Removable storage drive 514 may include a floppy disk drive, a magnetic tape drive, an optical disk drive, a flash memory, or the like. Removable storage drive 514 may read from and/or write to a removable storage unit 518 in a well-known manner. Removable storage unit 518 may include a floppy disk, a magnetic tape, an optical disk, etc., which may be read by and written to by removable storage drive 514. As will be appreciated by persons skilled in the relevant art, removable storage unit 518 may include a computer usable storage medium having stored therein computer software and/or data.

In alternative implementations, secondary memory 510 may include other similar means for allowing computer programs or other instructions to be loaded into computer system 500. Such means may include, for example, a removable storage unit 522 and an interface 520. Examples of such means may include a program cartridge and cartridge interface (such as that found in video game devices), a removable memory chip (such as an EPROM, or PROM) and associated socket, and other removable storage units 522 and interfaces 520 which allow software and data to be transferred from removable storage unit 522 to computer system 500.

Computer system 500 may also include a communications interface 524. Communications interface 524 allows software and data to be transferred between computer system 500 and external devices. Communications interface 524 may include a modem, a network interface (such as an Ethernet card), a communications port, a PCMCIA slot and card, or the like. Software and data transferred via communications interface 524 may be in the form of signals, which may be electronic, electromagnetic, optical, or other signals capable of being received by communications interface 524. These signals may be provided to communications interface 524 via a communications path 526. Communications path 526 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 518, removable storage unit 522, and a hard disk installed in hard disk drive 512. Computer program medium and computer usable medium may also refer to memories, such as main memory 508 and secondary memory 510, which may be memory semiconductors (e.g. DRAMs, etc.).

Computer programs (also called computer control logic) are stored in main memory 508 and/or secondary memory 510. Computer programs may also be received via communications interface 524. Such computer programs, when executed, enable computer system 500 to implement different embodiments of the present disclosure as discussed herein. In particular, the computer programs, when executed, enable processor device 504 to implement the processes of the present disclosure, such as the operations in method 100 illustrated by flowchart 100 of FIG. 1A to flowchart 10604 of FIG. 1F discussed above. Accordingly, such computer programs represent controllers of computer system 500. Where an exemplary embodiment of method 100 is implemented using software, the software may be stored in a computer program product and loaded into computer system 500 using removable storage drive 514, interface 520, and hard disk drive 512, or communications interface 524.

Embodiments of the present disclosure also may be directed to computer program products including software stored on any computer useable medium. Such software, when executed in one or more data processing device, causes a data processing device to operate as described herein. An embodiment of the present disclosure may employ any computer useable or readable medium. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nano-technological storage device, etc.).

The embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

While the foregoing has described what may be considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various implementations. This is for purposes of streamlining the disclosure, and is not to be interpreted as reflecting an intention that the claimed implementations require more features than are expressly recited in each claim. Rather, as the following claims reflect, inventive subject matter lies in less than all features of a single disclosed implementation. Thus, the following claims are hereby incorporated into the Detailed Description, with each claim standing on its own as a separately claimed subject matter.

While various implementations have been described, the description is intended to be exemplary, rather than limiting and it will be apparent to those of ordinary skill in the art that many more implementations and implementations are possible that are within the scope of the implementations. Although many possible combinations of features are shown in the accompanying figures and discussed in this detailed description, many other combinations of the disclosed features are possible. Any feature of any implementation may be used in combination with or substituted for any other feature or element in any other implementation unless specifically restricted. Therefore, it will be understood that any of the features shown and/or discussed in the present disclosure may be implemented together in any suitable combination. Accordingly, the implementations are not to be restricted except in light of the attached claims and their equivalents. Also, various modifications and changes may be made within the scope of the attached claims.

What is claimed is:

1. A method for navigating a vehicle through a predefined path comprising a plurality of predefined points in an environment, each of the plurality of predefined points comprising a respective predetermined location of a plurality of predetermined locations, the method comprising:
   generating, utilizing one or more processors, a distance database associated with the predefined path;
   selecting, utilizing the one or more processors, the predefined path by selecting each of the plurality of predefined points;
   navigating, utilizing the one or more processors, the vehicle to a first point of the plurality of predefined points the first point comprising a first predetermined location of the plurality of predetermined locations;
   obtaining, utilizing the one or more processors, an initial travelled distance and an initial steering of the vehicle, the initial travelled distance and the initial steering associated with the first point; and
   navigating, utilizing the one or more processors, the vehicle from the first point to a second point of the plurality of predefined points by repeating an iterative navigation process until a termination condition associated with the second point is satisfied, the iterative navigation process comprising:
      obtaining a first plurality of distances by measuring each of the first plurality of distances between a mobile transceiver placed on the vehicle and a fixed transceiver of a plurality of fixed transceivers, the fixed transceiver placed at a predefined location in the environment;
      extracting a second plurality of distances from the distance database, the second plurality of distances associated with distances between the first predetermined location and each of the plurality of predetermined locations;
      calculating a minimized estimation error between the first plurality of distances and the second plurality of distances utilizing the initial travelled distance and the initial steering;
      generating a steering command based on the minimized estimation error;
      navigating the vehicle by sending the steering command to the vehicle for a predefined period of time until the vehicle reaches a third point of the plurality of predefined points; and
      replacing the first point with the third point.

2. The method of claim 1, wherein generating the distance database comprises:
   constructing a curve passing through the plurality of predefined points utilizing a curve fitting method;
   driving the vehicle on the curve from a start point of the plurality of predefined points to an end point of the plurality of predefined points;
   measuring a plurality of travelled distances comprising a travelled distance on the curve from the start point to a predefined point of the plurality of predefined points based on odometer data of the vehicle;
   obtaining a plurality of transceiver distances by:
      receiving a plurality of transceiver signals, comprising receiving a transceiver signal of the plurality of transceiver signals from each of the plurality of fixed transceivers; and
      measuring distances between the mobile transceiver and each of the plurality of fixed transceivers based on the plurality of transceiver signals;
   saving the plurality of travelled distances, the plurality of transceiver distances, and a power of each of the plurality of transceiver signals in the distance database; and
   sending the distance database to a server.

3. The method of claim 2, wherein extracting the second plurality of distances comprises:
   sending the distance database by the server to the one or more processors;
   receiving the distance database from the server by the one or more processors;
   extracting, utilizing the one or more processors, the plurality of transceiver distances from the distance database; and
   obtaining the second plurality of distances by:
      calculating distances between the first predetermined location and each of the plurality of predetermined locations; and
      interpolating the plurality of transceiver distances based on the distances between the first predetermined location and each of the plurality of predetermined locations.

4. The method of claim 3, further comprising:
   extracting the power of the transceiver signal from the distance database;
   measuring a signal power received from the fixed transceiver;
   calculating, utilizing the one or more processors, a difference between the power of the transceiver signal and the signal power; and
   stopping the vehicle by sending a stop command to the vehicle responsive to the difference between the power of the transceiver signal and the signal power being higher than a maximum threshold.

5. The method of claim 2, wherein navigating the vehicle to the first point comprises:
   estimating an initial location of the vehicle at an initial point utilizing the mobile transceiver and the plurality of fixed transceivers;
   locating the first point by finding a distance between the predefined path and the initial location;
   estimating a pose of the vehicle based on the initial location utilizing an extended Kalman filtering (EKF)-based sensor fusion method, the pose of the vehicle comprising a pose direction; and
   navigating the vehicle from the initial location to the first point by repeating a recursive navigation process until a distance of a vehicle's location from the first point becomes smaller than a given threshold, the recursive navigation process comprising:
      updating the pose of the vehicle based on the vehicle's location utilizing the EKF-based sensor fusion method;
      moving the vehicle in the pose direction by sending a moving command to the vehicle;
      estimating the vehicle's location utilizing the mobile transceiver and the plurality of fixed transceivers; and
      calculating, utilizing the one or more processors, the distance of the vehicle's location from the first point.

6. The method of claim 5, wherein measuring each of the first plurality of distances between the mobile transceiver placed on the vehicle and the fixed transceiver comprises selecting the fixed transceiver from the plurality of fixed transceivers based on the predefined path, the initial point, and working conditions of the fixed transceiver.

7. The method of claim 2, wherein obtaining the initial travelled distance comprises calculating a length of the curve from the start point to the first point.

8. The method of claim 2, wherein calculating the minimized estimation error comprises minimizing a sum of squared differences between each of the first plurality of distances and a respective distance of the second plurality of distances.

9. The method of claim 8, wherein replacing the first point with the third point comprises:
estimating an updated travelled distance on the curve from the start point to the third point by:
measuring a length of a route travelled by the vehicle from the first point to the third point utilizing odometer data of the vehicle; and
calculating the updated travelled distance by adding a value of the length of the route to a value of the initial travelled distance;
replacing the initial travelled distance with the updated travelled distance;
obtaining an updated steering of the vehicle; and
replacing the initial steering with the updated steering.

10. The method of claim 1, wherein repeating the iterative navigation process until the termination condition is satisfied comprises repeating the iterative navigation process until a total travelled distance of the vehicle obtained from odometer data of the vehicle exceeds a termination threshold determined based on a distance between the first point and the second point on the predefined path.

11. A system for navigating a vehicle through a predefined path comprising a plurality of predefined points in an environment, each of the plurality of predefined points comprising a respective predetermined location of a plurality of predetermined locations, the system comprising:
a mobile transceiver placed on the vehicle;
a plurality of fixed transceivers placed at predefined locations in the environment;
a server configured to select the predefined path by selecting each of the plurality of predefined points;
a memory having processor-readable instructions stored therein; and
a processor configured to access the memory and execute the processor-readable instructions, which, when executed by the processor configures the processor to perform a method, the method comprising:
generating a distance database associated with the predefined path;
navigating the vehicle to a first point of the plurality of predefined points, the first point comprising a first predetermined location of the plurality of predetermined locations;
obtaining an initial travelled distance and an initial steering of the vehicle, the initial travelled distance and the initial steering associated with the first point; and
navigating the vehicle from the first point to a second point of the plurality of predefined points by repeating an iterative navigation process until a termination condition associated with the second point is satisfied, the iterative navigation process comprising:
obtaining a first plurality of distances by measuring each of the first plurality of distances between the mobile transceiver and a fixed transceiver of a plurality of fixed transceivers;
extracting a second plurality of distances from the distance database, the second plurality of distances associated with distances between the first predetermined location and each of the plurality of predetermined locations;
calculating a minimized estimation error between the first plurality of distances and the second plurality of distances utilizing the initial travelled distance and the initial steering;
generating a steering command associated with the minimized estimation error;
navigating the vehicle by sending the steering command to the vehicle for a predefined period of time until the vehicle reaches a third point of the plurality of predefined points; and
replacing the first point with the third point.

12. The system of claim 11, wherein generating the distance database comprises:
constructing a curve passing through the plurality of predefined points utilizing a curve fitting method;
measuring a plurality of travelled distances comprising a travelled distance on the curve from the start point to a predefined point of the plurality of predefined points based on odometer data of the vehicle, the vehicle configured to be driven on the curve from the start point to an end point of the plurality of predefined points;
obtaining a plurality of transceiver distances by:
receiving a plurality of transceiver signals, comprising receiving a transceiver signal of the plurality of transceiver signals from each of the plurality of fixed transceivers; and
measuring distances between the mobile transceiver and each of the plurality of fixed transceivers based on the plurality of transceiver signals;
saving the plurality of travelled distances, the plurality of transceiver distances, and a power of each of the plurality of transceiver signals in the distance database; and
sending the distance database to a server.

13. The system of claim 12, wherein extracting the second plurality of distances comprises:
sending the distance database by the server to the processor;
receiving the distance database from the server by the processor;
extracting the plurality of transceiver distances from the distance database; and
obtaining the second plurality of distances by:
calculating distances between the first predetermined location and each of the plurality of predetermined locations; and
interpolating the plurality of transceiver distances based on the distances between the first predetermined location and each of the plurality of predetermined locations.

14. The system of claim 13, further comprising:
extracting the power of the transceiver signal from the distance database;
measuring a signal power received from the fixed transceiver;
calculating a difference between the power of the transceiver signal and the signal power; and
stopping the vehicle by sending a stop command to the vehicle responsive to the difference between the power of the transceiver signal and the signal power being higher than a maximum threshold.

15. The system of claim 12, wherein navigating the vehicle to the first point comprises:

estimating an initial location of the vehicle at an initial point utilizing the mobile transceiver and the plurality of fixed transceivers;

locating the first point by finding a smallest distance between the predefined path and the initial location;

estimating a pose of the vehicle based on the initial location utilizing an extended Kalman filtering (EKF)-based sensor fusion method, the pose of the vehicle comprising a pose direction; and navigating the vehicle from the initial location to the first point by repeating a recursive navigation process until a distance of a vehicle's location from the first point becomes smaller than a given threshold, the recursive navigation process comprising:

updating the pose of the vehicle based on the vehicle's location utilizing the EKF-based sensor fusion method;

moving the vehicle in the pose direction by sending a moving command to the vehicle;

estimating the vehicle's location utilizing the mobile transceiver and the plurality of fixed transceivers; and calculating the distance of the vehicle's location from the first point.

16. The system of claim 15, wherein measuring each of the first plurality of distances between the mobile transceiver placed on the vehicle and the fixed transceiver comprises selecting the fixed transceiver from the plurality of fixed transceivers based on the predefined path, the initial point, and working conditions of the fixed transceiver.

17. The system of claim 12, wherein obtaining the initial travelled distance comprises calculating a length of the curve from the start point to the first point.

18. The method of claim 12, wherein calculating the minimized estimation error comprises minimizing a sum of squared differences between each of the first plurality of distances and a respective distance of the second plurality of distances.

19. The method of claim 18, wherein replacing the first point with the third point comprises:

estimating an updated travelled distance on the curve from the start point to the third point by:

measuring a route length travelled by the vehicle from the first point to the third point utilizing odometer data of the vehicle; and calculating the updated travelled distance by adding a value of the route length to a value of the initial travelled distance;

replacing the initial travelled distance with the updated travelled distance;

obtaining an updated steering of the vehicle; and replacing the initial steering with the updated steering.

20. The system of claim 11, wherein the termination condition comprises a total travelled distance of the vehicle obtained from odometer data of the vehicle exceeding a termination threshold determined based on a distance between the first point and the second point on the predefined path.

* * * * *